United States Patent
Lundberg et al.

(10) Patent No.: US 9,649,910 B2
(45) Date of Patent: May 16, 2017

(54) RUNNING A PHEV IN EV MODE UNDER COLD CONDITIONS

(71) Applicant: V2 Plug-in Hybrid Vehicle Partnership Handelsbolag, Gothenburg (SE)

(72) Inventors: Thomas Lundberg, Savedalen (SE); Ahmed El-Bahrawy, Savedalen (SE); Barne Corneliusson, Partille (SE)

(73) Assignee: V2 PLUG-IN HYBRID VEHICLE PARTNERSHIP HANDELBOLAG, Gothenburg (SE)

( * ) Notice: Subject to any disclaimer, the term of this patent is extended or adjusted under 35 U.S.C. 154(b) by 592 days.

(21) Appl. No.: 14/096,261

(22) Filed: Dec. 4, 2013

(65) Prior Publication Data

US 2014/0158784 A1 Jun. 12, 2014

(30) Foreign Application Priority Data

Dec. 11, 2012 (EP) .................................... 12196525

(51) Int. Cl.
*B60H 1/03* (2006.01)
*F01P 7/14* (2006.01)
(Continued)

(52) U.S. Cl.
CPC ..... *B60H 1/00764* (2013.01); *B60H 1/00885* (2013.01); *B60H 1/032* (2013.01);
(Continued)

(58) Field of Classification Search
CPC .............. B60H 1/007644; B60H 1/032; B60H 1/00885; B60H 1/004; B60H 1/12;
(Continued)

(56) References Cited

U.S. PATENT DOCUMENTS

| 2,332,149 | A | * | 10/1943 | Horton | B61D 27/0036 123/142.5 E |
| 4,417,618 | A | * | 11/1983 | Yoshimi | B60H 1/00842 165/204 |

(Continued)

FOREIGN PATENT DOCUMENTS

| DE | EP 0467130 A1 * | 1/1992 | ......... B60H 1/00314 |
| DE | EP 1055813 A2 * | 11/2000 | ................ F01P 3/20 |

(Continued)

OTHER PUBLICATIONS

Extended European Search Report from corresponding Application No. 12196525.5, mailed on May 15, 2013.

*Primary Examiner* — Gregory Huson
*Assistant Examiner* — Daniel E Namay
(74) *Attorney, Agent, or Firm* — Renner, Otto, Boisselle & Sklar, LLP.

(57) ABSTRACT

A plug-in hybrid electric vehicle has an internal combustion engine with a coolant outlet connected to a coolant inlet of a fuel operated heater and wherein a coolant outlet of the fuel operated heater is connected to a coolant inlet of an HVAC heater, a coolant outlet of the HVAC heater further being connected to a coolant inlet of the internal combustion engine. The vehicle also has a temperature sensor at the coolant outlet of the internal combustion engine and a temperature sensor at the coolant outlet of the fuel operated heater. The vehicle has a three way valve arranged between the coolant outlet of the HVAC heater and the coolant inlet of the internal combustion engine such that there is a connection between the coolant outlet of the HVAC heater and the coolant inlet of the fuel operated heater, the connection bypassing the internal combustion engine.

7 Claims, 1 Drawing Sheet

(51) Int. Cl.
  *B60H 1/00* (2006.01)
  *B64D 13/08* (2006.01)

(52) U.S. Cl.
  CPC .............. *F01P 7/14* (2013.01); *F01P 2050/24* (2013.01); *F01P 2060/08* (2013.01)

(58) Field of Classification Search
  CPC ...... F01P 2050/24; F01P 2060/08; F01P 7/14; B64D 2700/62973
  USPC .............. 237/5, 8 A, 12, 12.3 B, 28, 34, 59; 903/905
  IPC ....... B60H 1/00,1/03; F01P 7/14; B64D 13/08
  See application file for complete search history.

(56) References Cited

U.S. PATENT DOCUMENTS

| | | | | |
|---|---|---|---|---|
| 4,531,379 | A * | 7/1985 | Diefenthaler, Jr. | B60H 1/3222 123/41.06 |
| 5,174,254 | A * | 12/1992 | Humburg | B60H 1/00485 123/142.5 R |
| 6,260,766 | B1 | 7/2001 | Morikawa | B60H 1/03 122/26 |
| 6,712,028 | B1 * | 3/2004 | Robbins | F01P 7/161 123/41.08 |
| 6,904,875 | B2 * | 6/2005 | Kilger | F01P 7/164 123/41.1 |
| 7,063,138 | B2 * | 6/2006 | Salim | B60H 1/005 165/10 |
| 7,464,672 | B2 * | 12/2008 | Vetrovec | F01P 11/20 123/41.14 |
| 7,735,744 | B2 * | 6/2010 | Eisenhour | B60H 1/00735 165/202 |
| 7,886,988 | B2 * | 2/2011 | Schwartz | F01P 7/167 123/41.1 |
| 2004/0011068 | A1 * | 1/2004 | Hatakeyama | B60H 1/00849 62/228.1 |
| 2004/0168449 | A1 * | 9/2004 | Homan | B60H 1/004 62/134 |
| 2005/0066669 | A1 * | 3/2005 | Sugesawa | B60H 1/3205 62/133 |
| 2006/0005789 | A1 * | 1/2006 | Miura | F01P 7/16 123/41.1 |
| 2006/0086816 | A1 * | 4/2006 | Schwartz | F01P 7/167 237/12.3 R |
| 2007/0101736 | A1 * | 5/2007 | Sawada | B60H 1/3208 62/230 |
| 2007/0162257 | A1 * | 7/2007 | Kostyk | G06Q 10/04 702/182 |
| 2009/0283604 | A1 * | 11/2009 | Martinchick | B60H 1/00392 237/12.3 B |
| 2012/0160447 | A1 * | 6/2012 | Kinomura | B60H 1/025 165/51 |
| 2013/0146000 | A1 * | 6/2013 | Choi | F01P 11/00 123/41.14 |
| 2014/0020376 | A1 * | 1/2014 | Katayama | F02G 1/06 60/524 |
| 2014/0087644 | A1 * | 3/2014 | Watanabe | B60H 1/00785 454/75 |
| 2014/0103128 | A1 * | 4/2014 | Patel | B60H 1/00885 237/5 |

FOREIGN PATENT DOCUMENTS

| | | | |
|---|---|---|---|
| DE | 19942728 A1 * | 3/2001 | ............... F01P 3/20 |
| DE | 10047222 A1 * | 4/2002 | ......... B60H 1/00314 |
| DE | 102008032529 A1 | 1/2010 | |
| EP | 0250066 A2 * | 12/1987 | ............... B60H 1/03 |
| EP | 1122104 A2 | 8/2001 | |
| FR | 2897392 A1 * | 8/2007 | ............... F01P 7/165 |
| FR | 2951114 A1 | 4/2011 | |
| JP | DE 19713804 A1 * | 10/1997 | ......... B60H 1/00314 |
| JP | CA 2262128 A1 * | 8/1999 | ............... F01P 3/20 |
| JP | 2003322019 A * | 11/2003 | |

* cited by examiner

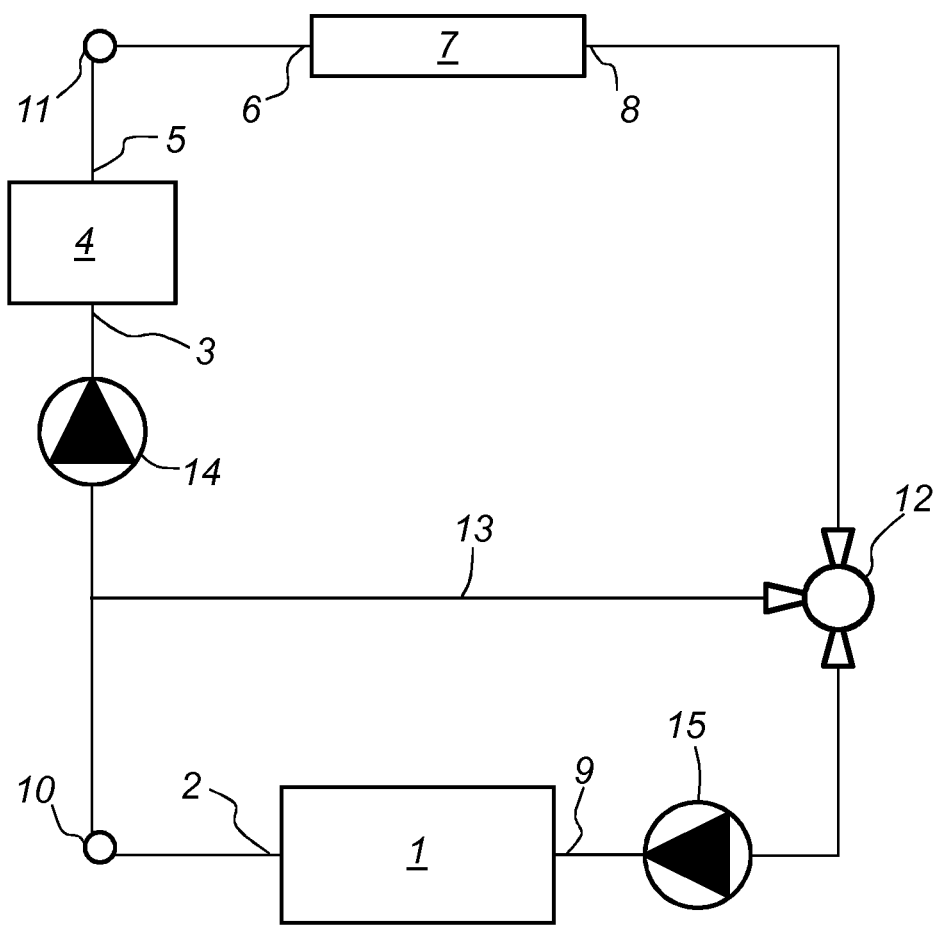

RUNNING A PHEV IN EV MODE UNDER COLD CONDITIONS

FIELD OF THE INVENTION

The present invention relates to a plug-in hybrid electric vehicle comprising an internal combustion engine, a coolant outlet of the internal combustion engine being connected to a coolant inlet of a fuel operated heater and wherein a coolant outlet of the fuel operated heater is connected to a coolant inlet of an HVAC heater, a coolant outlet of the HVAC heater further being connected to a coolant inlet of the internal combustion engine, the vehicle further comprising a temperature sensor arranged at the coolant outlet of the internal combustion engine and a temperature sensor arranged at the coolant outlet of the fuel operated heater.

BACKGROUND

A plug-in hybrid electric vehicle with an internal combustion engine is generally not feasible to run in pure electric drive mode at ambient temperatures below 15° C. since the fuel operated heater combined with an electric pump is not sufficient for providing the requested passenger compartment and internal combustion engine thermal targets (the latter to facilitate acceptable vehicle take-off performance at driving mode shift from electrical drive mode to an ICE-initiated one (e.g. HEV, ICE-drive or AWD)). In a regular hybrid vehicle, i.e. a vehicle that only runs short distances on electric drive, heating is not an issue since the internal combustion engine is run regularly which helps increase the temperature of the coolant sufficiently for a period of pure electric drive while maintaining requested internal combustion engine and passenger compartment temperatures.

SUMMARY OF THE INVENTION

The object of the present invention is to provide a system and a method for controlling the thermal power generated by the fuel operated heater and the internal combustion engine of a plug-in hybrid in such a way that pure electric drive feasibility is maximised in time and in ambient temperature range such that it is extended below 15° C. and as far down as −40° C. and, moreover, the climate system electric power consumption at and above an ambient temperature of 25° C. is minimised.

This object is achieved with a system and a method according to the enclosed claims.

According to one aspect of the present invention a plug-in hybrid electric vehicle comprises an internal combustion engine, a coolant outlet of the internal combustion engine being connected to a coolant inlet of a fuel operated heater and wherein a coolant outlet of the fuel operated heater is connected to a coolant inlet of an HVAC heater. A coolant outlet of the HVAC heater is further connected to a coolant inlet of the internal combustion engine, the vehicle further comprising a temperature sensor arranged at the coolant outlet of the internal combustion engine and a temperature sensor arranged at the coolant outlet of the fuel operated heater. The vehicle further comprises a three way valve arranged between the coolant outlet of the HVAC heater and the coolant inlet of the internal combustion engine such that there is a connection between the coolant outlet of the HVAC heater and the coolant inlet of the fuel operated heater, the connection thus bypassing the internal combustion engine.

The bypass of the internal combustion engine is one of the factors contributing to the possibility to run a vehicle on pure electric drive at cold weather while fulfilling both climate system and internal combustion engine thermal targets. For instance, in a situation where the vehicle has not been running for several hours the engine and the coolant temperatures are more or less equal to the ambient temperature. If the ambient temperature is about 0° C., by fully bypassing the internal combustion engine at electrical drive, the fuel operated heater will be able to provide sufficient heat to relatively fast warm up the passenger compartment to a desired temperature and thereafter a partial bypassing of the internal combustion engine will provide sufficient heat to fulfil its thermal targets while maintaining the passenger compartment temperature at climate comfort. Without the bypass the internal combustion engine would cool down the coolant to such an extent that the fuel operated heater would never alone be able to handle the passenger compartment heating. For a fuel operated heater to alone manage this it would have to be dimensioned such that it would not be realistic to incorporate into the vehicle and would also be energy inefficient requiring large amounts of energy to run, i.e. the fuel economy and the environment would suffer from this. Moreover, by fully bypassing the cabin heater at and above 25° C. ambient temperature at an internal combustion engine-initiated or electrical drive mode the electrical power needed to fulfil the climate system thermal targets is reduced and minimised.

According to another aspect of the present invention the vehicle further comprises an electrical pump upstream the coolant inlet of the fuel operated heater. When none or a limited part of the coolant flows through the internal combustion engine or when the internal combustion engine is not running, i.e. at electrical drive, the coolant circuit needs a pump to circulate the coolant through the fuel operated heater and the HVAC heater.

According to yet another aspect of the present invention the vehicle further comprises a mechanical pump upstream the coolant inlet of the internal combustion engine. This pump is preferably a more or less integrated part of the engine such that it runs when the internal combustion engine is running.

The three way valve is according to one aspect of the present invention an electromagnetic valve. An electromagnetic valve can be controlled such that it opens and closes with different frequencies in order to allow for varying flows, for instance, a 70/30, 50/50, or 30/70 flow.

According to a further aspect of the present invention three way valve is a vacuum valve. If there is a vacuum system available a vacuum valve is both cheaper and lighter compared to an electromagnetic valve.

A further possibility would be to use a standard continuous electric machine driven control valve which could vary from 0 to 100% coolant flow that stays in a specific position as compared to the electromagnetic valve which is either closed or open as a function of time.

BRIEF DESCRIPTION OF THE DRAWINGS

The invention will now be further disclosed with reference to the accompanying drawings in which FIG. 1 shows a simplified layout of the system according to the present invention.

DISCLOSURE OF PREFERRED EMBODIMENTS

FIG. 1 shows an internal combustion engine 1, a coolant outlet 2 of the internal combustion engine 1 that is connected to a coolant inlet 3 of a fuel operated heater 4 and wherein a coolant outlet 5 of the fuel operated heater 4 is connected to a coolant inlet 6 of an HVAC heater 7, a coolant outlet 8 of the HVAC heater 7 further being connected to a coolant inlet 9 of the internal combustion engine 1. Also shown is a temperature sensor 10 arranged at the coolant outlet 2 of the internal combustion engine 1 and a temperature sensor 11 arranged at the coolant outlet 5 of the fuel operated heater 4.

FIG. 1 further shows a three way valve 12 arranged between the coolant outlet 8 of the HVAC heater 7 and the coolant inlet 9 of the internal combustion engine 1 such that there is a connection 13 between the coolant outlet 8 of the HVAC heater 7 and the coolant inlet 3 of the fuel operated heater 4, the connection 13 thus bypassing the internal combustion engine 1. An electrical pump 14 will run when the short flow circuit is fully or partially used at all plug-in hybrid electric vehicles' (PHEV) driving modes or when the long flow circuit is used at electrical drive mode and a mechanical pump 15 will run when the internal combustion engine 1 is running.

To make electrical drive feasible at and below 15° C. ambient temperature with fulfilled climate system and internal combustion engine (ICE) thermal targets (the latter to facilitate acceptable vehicle take-off performance at driving mode shift from electrical drive mode to an ICE-initiated one (e.g., HEV, ICE-drive or AWD)) as well as reduce and minimise the electrical power needed to fulfil the climate system thermal targets at and above 25° C. ambient temperature.

the ICE-cabin heater coolant circuit is split into two by a valve that controls the coolant water flow through both and as a consequence the thermal power distribution to the ICE and the cabin heater, see FIG. 1, a modular valve control strategy that efficiently considers all the PHEV driving modes (i.e. EV-, HEV-, and ICE-drive-modes) and different thermal initial conditions, by optimally dealing with a simultaneous or an individual fulfilment of ICE's and climate system's thermal power needs/targets. This modular control strategy (where the control algorithm different modules can be reused, activated or deactivated at the different initial and operational conditions) reduces system solution complexity, decreases needed software variations, and improve robustness whereas paving the way for an efficient introduction of the whole system (i.e., hardware and software) to any other existing or future vehicle (e.g., EV-, HEV-, PHEV-, or ICE-drive-vehicle) with positive impact on product development, production, and production costs, a short time limited, power consumption efficient, and sparking-plugs durability accounted ICE's plugs pre-glow dependant on PHEV's electrical drive mode shift-arising information (e.g. gas pedal angle at overtaking or high voltage battery state of charge level close to sustaining) to an ICE-initiated one (e.g., HEV, ICE-drive or AWD) that considers ICE's thermal power needs related to vehicle take-off target at such PHEV-driving mode shift at cold climate at and below 15° C. ambient temperature until the coolant water temperature at ICE-side is at or above the ICE's thermal targets, and a climate control system's "ICE-Start"-control strategy where the ICE operates as an additional heater, to further extend EV-drive feasibility below 0° C. down to about −40° C. ambient temperature with fulfilled ICE's- and climate system-targets have been developed and implemented to fulfil and extend electrical drive feasibility between 15° C. and about −40° C. ambient temperature as well as minimise climate system electrical power needs at and above 25° C. ambient temperature (which benefits both OEM and final customer) while fully extracting and utilizing the PHEV technologies full capacities.

The following is a description of how the system is controlled under various conditions.

I—Cold climate electrical drive climate system control strategy at cold start, i.e. $0° C. \leq T_{amb} = T_{ICE-out} = T_{FOH-out} \leq 15° C.$ If $0° C. \leq T_{amb} = T_{ICE-out} = T_{FOH-out} \leq 15° C.$ at electrical drive "key-on" then:

1—request the fuel operated heater (FOH) start (including electrical water pump).

2—request closed valve, i.e. coolant volume flow is limited to FOH-SFC ($v$) until $\mathcal{T} = x$ [min] or $T_{FOH-out} = Y$ [° C.] (where $Y < T_{FOH-half}$), then allow a partial coolant volume flow $v = v$ through the valve to ICE (while the FOH-short flow circuit (FOH-SFC) coolant volume flow remain v, i.e. total coolant volume flow is $v + v < V$). Thereafter, at $\mathcal{T} = X$ [min] or $T_{FOH-out} = T_{FOH-half} - y$ [° C.], request open valve until $T_{ICE-out} = T_{ICE-target}$, then the valve control will allow a partial coolant volume flow $v = V$ to the ICE to maintain $T_{ICE-out} = T_{ICE-target}$ while the reminder of the thermal power generated by FOH is used to approach and maintain climate comfort through the FOH-SFC volume flow ($v$) where the total coolant volume flow is v+V.

3—If $T_{FOH-out} = T_{FOH-half} - y$ [° C.] then request open valve until $T_{FOH-out} = T_{FOH-half} - \gamma$ [° C.] where $\gamma - y = 5°$ C. then allow a partial volume flow $v = v$ again and so on for $\mathcal{T} = \chi$ [min]. Thereafter, $T_{FOH-out}$ will approach $T_{FOH-half}$ and the FOH will shift to operate at half-power/capacity. If $T_{FOH-out} = T_{FOH-full} + y$ [° C.] then request closed valve until $T_{FOH-out} = T_{FOH-full} + \gamma$ [° C.] (where $\gamma - y = 5°$ C.) then allow a partial volume flow $v = v$ once again and so on for $\mathcal{T} = x$ [min]. Thereafter, Thereafter, $T_{FOH-out}$ will approach $T_{FOH-full}$ and the FOH will shift to operate at full-power/capacity, and so on. The reason for that is to damp down any eventual quick fluctuation of the FOH operation between its full and half power/capacity which is harmful for it when dealing with durability.

4—If $T_{FOH-out} = T_{FOH-off} - y$ [° C.] then request open valve to avoid FOH turn off during electrical vehicle drive below 15° C. ambient temperature. If, thereafter, $T_{FOH-out}$ approaches $T_{FOH-out} = T_{FOH-half} - \gamma$ [° C.] then follow I-3 above.

5—A short time limited ICE-plugs pre-glow dependant on drive mode shift-arising information (e.g. gas pedal angle at overtaking or high voltage battery state of charge level close to sustaining) will be used to achieve a power consumption efficient and take-off acceptable PHEV-mode shift (from EV- to HEV-, ICE-, or AWD-drive mode) performance. This ICE-plugs pre-glow will be available until $\mathcal{T} = X$ [min] or $T_{ICE-out} \geq T_{ICE-target}$.

II—Cold climate, i.e. $-8° C. \leq T_{amb} \leq 15° C.$, electrical drive climate system control strategy of a FOH-preconditioned or warm started vehicle, where $T_{ICE-out} < T_{ICE-FOH-on-req}$ and $T_{ICE-out} \leq T_{FOH-out} < T_{FOH-off}$ If $-8° C. \leq T_{amb} \leq 15° C.$ and $T_{ICE-out} < T_{ICE-FOH-on-req}$ and $T_{ICE-out} \leq T_{FOH-out} < T_{FOH-off}$ (e.g. after a timer start FOH-based preconditioning), at electrical drive "key-on" then request control strategy as at I above.

III—Cold climate, i.e. ~−8° C.≤$T_{amb}$≤15° C., electrical drive climate system control strategy of a FOH-preconditioned or warm started vehicle, where $T_{ICE-out}$>$T_{ICE-FOH-on-req}$ and $T_{FOH-out}$≥$T_{ICE-out}$ If ~−8° C.≤$T_{amb}$≤15° C. and $T_{ICE-out}$>$T_{ICE-FOH-on-req}$ and $T_{FOH-out}$≥$T_{ICE-out}$ (e.g. after a direct start (DS) FOH-based preconditioning), i.e. FOH is off, at electrical drive "key-on" then:
  1—request the electrical water pump to start
  2—FOH will remain off until $T_{ICE-out}$=$T_{ICE-FOH-on-req}$ then it will turn on where the valve remain open until $T_{FOH-out}$>$T_{ICE-out}$+Y [° C.] and then it requested closed, i.e. coolant volume flow is limited to FOH-SFC (v).
  3—IF $T_{FOH-out}$ approach $T_{FOH-out}$=$T_{FOH-half}$−y [° C.] then go to I-3 and 4 above.
  4—if $T_{ICE-out}$ approach $T_{ICE-target}$ the valve control will allow a partial coolant volume flow ν =V to ICE to maintain $T_{ICE-out}$=$T_{ICE-target}$ while the reminder of the thermal power generated by FOH is used to approach and maintain climate comfort through the FOH-SFC volume flow (v).
  5—No short time limited ICE-plugs pre-glow will be needed in this case.

IV—Cold climate electrical drive climate system control strategy at cold start, i.e. −40° C.<$T_{amb}$=$T_{ICE-out}$=$T_{FOH-out}$<0° C.

If ~−40° C.≤$T_{amb}$=$T_{ICE-out}$=$T_{FOH-out}$≤0° C. at electrical drive "key-on" then:
  1—request both ICE and FOH (including electrical water pump) to turn on as well as open valve until $T_{ICE-out}$ approaches $T_{ICE-ICE-off-req}$ then turn off the ICE, i.e. allow electrical drive.
  2—at $T_{ICE-out}$≤$T_{ICE-FOH-on-req}$−𝒴 (where 𝒴 varies with $T_{amb}$) the valve control will follow III-2 above (i.e. when $T_{FOH-out}$>$T_{ICE-out}$+Y [° C.] request closed valve) and otherwise (at $T_{ICE-out}$>$T_{ICE-FOH-on-reg}$−𝒴 the valve will be open.
  3—when $T_{FOH-out}$ approaches $T_{FOH-ICE-on-reg}$ turn on the ICE (i.e. electrical drive comes to an end) until $T_{ICE-out}$ approaches $T_{ICE-ICE-off-reg}$ then turn off the ICE once again and so on until the high voltage battery state of charge level achieve the sustaining one and the vehicle shifts to HEV-driving mode. The number of electrical drive interruptions by ICE-start depends, among other things, on $T_{amb}$ and vehicle speed.

V—Cold climate, i.e. −40° C.<$T_{amb}$<0° C., electrical drive climate system control strategy at warm start, i.e. $T_{FOH-out}$>$T_{FOH-ICE-on-req}$ If ~−40° C.≤$T_{amb}$<0° C. and $T_{FOH-out}$>$T_{FOH-ICE-on-req}$ at electrical drive at electrical drive "key-on" then:
  1—the FOH will turn on (including electrical water pump) and the ICE will remain off (i.e. electrical drive is feasible) until $T_{FOH-out}$=$T_{FOH-ICE-on-req}$ where the ICE will turn on (i.e. electrical drive comes to an end) until $T_{ICE-out}$=$T_{ICE-ICE-off-req}$ where it (the ICE) will turn off (i.e. electrical drive is feasible once again) and so on until the high voltage battery state of charge level achieve the sustaining one and the vehicle shifts to HEV-driving mode.
  2—the valve control will follow IV-2 above.
  3—Again, the number of electrical drive interruptions by ICE-start depends on $T_{amb}$ and vehicle speed.

VI—Cold climate, i.e. −40° C.<$T_{amb}$<0° C., electrical drive climate system control strategy at warm start, i.e. $T_{FOH-out}$<$T_{FOH-ICE-on-req}$ If ~−40° C.≤$T_{amb}$<0° C. and $T_{FOH-out}$<$T_{FOH-ICE-on-req}$ at electrical drive at electrical drive "key-on" then:
  1—both ICE and FOH (including electrical water pump) will turn on (i.e. electrical drive is not feasible) until $T_{ICE-out}$=$T_{ICE-ICE-off-req}$ where the ICE will turn off (i.e. electrical drive is feasible) until $T_{FOH-out}$=$T_{FOH-ICE-on-req}$ where the ICE will turn on once again (i.e. electrical drive comes to an end) and so on until the high voltage battery state of charge level achieve the sustaining one and the vehicle shifts to HEV-driving mode.
  2—the valve control will follow IV-2 above.
  3—Again, the number of electrical drive interruptions by ICE-start depends on $T_{amb}$ and vehicle speed.

VII—Cold climate HEV (i.e. Hybrid-Sustaining)-drive climate system control strategy at cold start, i.e. −40° C.≤$T_{amb}$=$T_{ICE-out}$=$T_{FOH-out}$≤15° C.

If ~−40° C.≤$T_{amb}$=$T_{ICE-out}$=$T_{FOH-out}$≤15° C. at HEV (i.e. Hybrid-Sustaining)-drive "key-on" where the vehicle shifts between ICE- and electrical machine drive within a certain high voltage battery state of charge interval, then:
  1—request FOH-start (including electrical water pump) and open valve, i.e. coolant volume flow is V.
  2—when $T_{FOH-out}$>$T_{ICE-out}$+Y [° C.] then request closed valve, i.e. coolant volume flow is limited to FOH-SFC (v) until $T_{FOH-out}$<$T_{ICE-out}$−Y [° C.] then request open valve and so on until $T_{FOH-out}$=$T_{ICE-FOH-off-req}$ then the FOH will turn off and the valve will remain open as at its default position.
  3—when $T_{ICE-out}$=$T_{ICE-FOH-on-req}$ then the FOH will restart and the above mentioned control strategy at 2 will be re-performed.

VIII—Cold climate HEV (i.e. Hybrid-Sustaining)-drive, i.e. −40° C.<$T_{amb}$<15° C., climate system control strategy at warm start where $T_{ICE-out}$<$T_{ICE-FOH-on-req}$ or $T_{ICE-out}$>$T_{ICE-FOH-on-req}$ and $T_{FOH-out}$≥$T_{ICE-out}$ If ~−40° C.≤$T_{amb}$<15° C. and $T_{ICE-out}$>$T_{ICE-FOH-on-req}$ at HEV (i.e. Hybrid-Sustaining)-drive "key-on" then the FOH will remain off until $T_{ICE-out}$=$T_{ICE-FOH-on-req}$ where it will turn on (including electrical water pump) and the above mentioned control strategy at VII-2 and 3 will be performed.

If ~−40° C.≤$T_{amb}$<15° C. and $T_{ICE-out}$<$T_{ICE-FOH-on-req}$ at HEV (i.e. Hybrid-Sustaining)-drive "key-on" then the FOH will turn on (including electrical water pump) and the above mentioned control strategy at VII-2 and 3 will be performed.

IX—Cold climate ICE- and AWD-drive climate system control strategy at cold start, i.e. −40° C.≤$T_{amb}$=$T_{ICE-out}$=$T_{FOH-out}$≤15° C. or warm start, where $T_{ICE-out}$<$T_{ICE-FOH-on-req}$ or $T_{ICE-out}$>$T_{ICE-FOH-on-req}$ and $T_{FOH-out}$≥$T_{ICE-out}$ Operation is similar as at HEV-driving mode at VII and VIII with the exception of having ICE continuously running during the driving mode which further limits the needs of FOH as a supplementary heater.

X—Warm climate HEV-, ICE- and AWD-drive climate system control strategy at cold start, i.e. 25° C.≤$T_{amb}$=$T_{ICE-out}$=$T_{FOH-out}$ or warm start, where $T_{ICE-out}$≈$T_{FOH-out}$>$T_{amb}$≥25° C.

If 25° C.≤$T_{amb}$=$T_{ICE-out}$=$T_{FOH-out}$ or $T_{ICE-out}$≈$T_{FOH-out}$>$T_{amb}$≥25° C. at PHEV drive mode where the ICE is on (e.g. HEV-, ICE- or AWD-drive) then request closed valve. The FOH and electrical pump will remain off and the ICE driven mechanical pump will circulate the coolant water within the ICE-part of the coolant circuit but not the short flow circuit, i.e. the cabin heater- and FOH-part of the coolant circuit.

XI—Warm climate electrical drive climate system control strategy at cold start, i.e. $25°\ C.\leq T_{amb}=T_{ICE-out}=T_{FOH-out}$ or warm start, where $T_{ICE-out}\approx T_{FOH-out}>T_{amb}\geq 25°\ C.$ If $25°\ C.\leq T_{amb}=T_{ICE-out}=T_{FOH-out}$ or $T_{ICE-out}\approx T_{FOH-out}>T_{amb}\geq 25°\ C.$ at electrical drive then request closed valve while the FOH and electrical pump will remain off.

The foregoing is a disclosure of an example practicing the present invention. However, it is apparent that method incorporating modifications and variations will be obvious to one skilled in the art. Inasmuch as the foregoing disclosure is intended to enable one skilled in the art to practice the instant invention, it should not be construed to be limited thereby, but should be construed to include such modifications and variations as fall within the scope of the claims.

DEFINITIONS

ICE Internal Combustion Engine
FOH Fuel Operated Heater
$\mathcal{T}$ Operation time
$T_{amb}$ Ambient temperature
V Coolant water volume flow through the ICE coolant circuit at open valve
v Coolant water volume flow through the FOH's short flow circuit (FOH-SFC) at closed valve
$\nu$ Partial coolant water volume flow through the valve to ICE where $\nu \leq v \leq V$, and $\nu = v = V$ at open valve
$T_{FOH-out}$ Coolant temperature after the FOH
$T_{ICE-out}$ Coolant temperature after the ICE
$T_{HVAC-in}$ Coolant temperature before cabin heater
$T_{HVAC-out}$ Coolant temperature after cabin heater
$T_{FOH-off}$ FOH's coolant temperature that requests FOH to turn-off
$T_{FOH-half}$ FOH's coolant temperature that requests FOH to operate at half power/capacity
$T_{FOH-full}$ FOH's coolant temperature that requests FOH to operate at full power/capacity while it is operating at half power/capacity
$T_{ICE-target}$ ICE's coolant temperature that is required to approach an acceptable vehicle take-off performance at mode shift from electrical drive to an ICE initiated one
$T_{ICE-FOH-on-req}$ ICE's coolant temperature that requests FOH to turn-on as an additional heater
$T_{ICE-FOH-off-req}$ ICE's coolant temperature that requests FOH to turn-off as an additional heater
$T_{FOH-ICE-on-req}$ FOH's coolant temperature that requests ICE to turn-on as an additional heater
$T_{ICE-ICE-off-req}$ ICE's coolant temperature that requests ICE to turn-off as an additional heater

The invention claimed is:

1. A plug-in hybrid electric vehicle comprising an internal combustion engine, a coolant outlet of the internal combustion engine being connected to a coolant inlet of a fuel operated heater and wherein a coolant outlet of the fuel operated heater is connected to a coolant inlet of an HVAC heater, a coolant outlet of the HVAC heater further being connected to a coolant inlet of the internal combustion engine, the vehicle further comprising a temperature sensor arranged at the coolant outlet of the internal combustion engine and a temperature sensor arranged at the coolant outlet of the fuel operated heater,
wherein the vehicle further comprises a three way valve arranged between the coolant outlet of the HVAC heater and the coolant inlet of the internal combustion engine such that there is a connection between the coolant outlet of the HVAC heater and the coolant inlet of the fuel operated heater, the connection thus bypassing the internal combustion engine,
wherein the three way valve is configured to, at electrical driving (EV or HEV) modes of the plug-in hybrid electric vehicle and upon at least one of the temperature sensor arranged at the coolant outlet of the internal combustion engine or the temperature sensor arranged at the coolant outlet of the fuel operated heater sensing a temperature less than or equal to a certain threshold temperature, close to direct coolant flow to bypass the internal combustion engine through the connection and thereafter, upon a certain operation time or upon the temperature sensor arranged at the coolant outlet of the fuel operated heater sensing a temperature less than a second certain threshold temperature, partially open to allow partial coolant volume flow through the valve to the internal combustion engine while at least some coolant flow through the connection remains.

2. The plug-in hybrid electric vehicle according to claim 1, wherein the vehicle further comprises an electrical pump upstream the coolant inlet of the fuel operated heater.

3. The plug-in hybrid electric vehicle according to claim 1, wherein the vehicle further comprises a mechanical pump upstream the coolant inlet of the internal combustion engine.

4. The plug-in hybrid electric vehicle according to claim 1, wherein the three way valve is an electromagnetic valve.

5. The plug-in hybrid electric vehicle according to claim 1, wherein the three way valve is a vacuum valve.

6. The plug-in hybrid electric vehicle according to claim 1, wherein the three way valve is an electric machine driven continuous coolant flow control valve.

7. A method for controlling an internal combustion-cabin heater coolant circuit for a plug-in hybrid electric vehicle, the vehicle comprising an internal combustion engine, a coolant outlet of the internal combustion engine being connected to a coolant inlet of a fuel operated heater and wherein a coolant outlet of the fuel operated heater is connected to a coolant inlet of an HVAC heater, a coolant outlet of the HVAC heater further being connected to a coolant inlet of the internal combustion engine, the vehicle further comprising a temperature sensor arranged at the coolant outlet of the internal combustion engine and a temperature sensor arranged at the coolant outlet of the fuel operated heater, the vehicle further comprising a three way valve arranged between the coolant outlet of the HVAC heater and the coolant inlet of the internal combustion engine such that there is a connection between the coolant outlet of the HVAC heater and the coolant inlet of the fuel operated heater, the connection thus bypassing the internal combustion engine, the circuit comprising an electrical pump, the vehicle further comprising a climate system control unit, an internal combustion engine control unit, and an ambient temperature sensor, the method comprising,
monitoring the ambient temperature,
if the vehicle is in electric drive and the ambient temperature is below or equal to 15° C. and above or equal to 0° C. and the coolant outlet temperature of the fuel operated heater and the coolant outlet temperature of the internal combustion engine are equal to the ambient temperature, request start of the fuel operated heater and the electrical pump and request closing of the valve to direct coolant flow through the connection to bypass the internal combustion engine, and thereafter, if a certain operation time has passed or if the coolant outlet temperature of the fuel operated heater is less than a temperature (Y) corresponding to a temperature which is less than a coolant outlet temperature of the fuel operated heater for which half power/capacity operation the fuel operated heater is to be requested, request partial opening of the valve to allow partial coolant volume flow through the valve to the internal combustion engine while at least some coolant flow through the connection remains, if the vehicle is in electric drive and the ambient temperature is below 0° C. and above −40° C. and the coolant outlet temperature of the fuel operated heater and the coolant outlet temperature of the internal combustion engine are equal to the ambient temperature, request start of the internal combustion engine and start of the fuel operated heater and start of the electrical pump where the valve control will be aimed to optimally fulfil the internal combustion engine and the climate system thermal targets considering the vehicle fuel consumption and its electrical drive feasibility, if the vehicle is in electric drive and the ambient temperature is equal to or below 15° C. or above −8° C. and the coolant outlet temperature of the internal combustion engine is lower than the coolant outlet temperature when the fuel operated heater is requested to start, request start of the fuel operated heater and start of the electrical pump and request closing of the valve to direct coolant flow through the connection to bypass the internal combustion engine, if the vehicle is in electric drive and the ambient temperature is equal to or below 15° C. or above −8° C. and the coolant outlet temperature of the internal combustion engine is higher than the coolant outlet temperature when the fuel operated heater is requested to start, request start of the electrical pump but not the fuel operated heater and request opening of the valve, if the vehicle is in electric drive and the ambient temperature is below 0° C. and above −40° C. and the coolant outlet temperature of the fuel operated heater is higher than the temperature when the internal combustion engine is requested to start, request start of the fuel operated heater and electrical pump where the valve control will aim to optimally fulfil the internal combustion engine and the climate system thermal targets considering the vehicle fuel consumption and its electrical drive feasibility, if the vehicle is in electric drive and the ambient temperature is below 0° C. and above −40° C. and the coolant outlet temperature of the fuel operated heater is lower than the temperature when the internal combustion engine is requested to start, request start of the internal combustion engine, start of the fuel operated heater, and start of the electrical pump where the valve control will aim to optimally fulfil the internal combustion engine and the climate system thermal targets considering the vehicle fuel consumption and its electrical drive feasibility, if the vehicle is in hybrid drive and the ambient temperature is equal to or below 15° C. and above −40° C. and the coolant outlet temperature of the fuel operated heater and the coolant outlet temperature of the internal combustion engine are equal to the ambient temperature, request start of the fuel operated heater and start of the electrical pump and request opening of the valve, if the vehicle is in hybrid drive and the ambient temperature is equal to or below 15° C. and above −40° C. and the coolant outlet temperature of the internal combustion engine is higher than the coolant outlet temperature when the fuel operated heater is requested to start, request opening of the valve but do not request start of either the fuel operated heater or the electrical pump, if the vehicle is in hybrid drive and the ambient temperature is equal to or below 15° C. and above −40° C. and the coolant outlet temperature of the internal combustion engine is lower than the coolant outlet temperature when the fuel operated heater is requested to start, request start of fuel operated heater and start of electrical pump and request opening of the valve, if the vehicle is in an internal combustion engine driving mode and the ambient temperature is equal to or below 15° C. and above −40° C. and the coolant outlet temperature of the fuel operated heater and the coolant outlet temperature of the internal combustion engine are equal to the ambient temperature, request start of the fuel operated heater and start of the electrical pump and request opening of the valve, if the vehicle is in an internal combustion engine driving mode and the ambient temperature is equal to or below 15° C. and above −40° C. and the coolant outlet temperature of the internal combustion engine is higher than the coolant outlet temperature when the fuel operated heater is requested to start, request opening of the valve but do not request start of either the fuel operated heater or the electrical pump, if the vehicle is in an internal combustion engine driving mode and the ambient temperature is equal to or below 15° C. and above −40° C. and the coolant outlet temperature of the internal combustion engine is lower than the coolant outlet temperature when the fuel operated heater is requested to start, request start of fuel operated heater and start of electrical pump and request opening of the valve, if the vehicle is in a hybrid or an internal combustion engine driving mode and the ambient temperature is above or equal to 25° C. and the coolant outlet temperature of the fuel operated heater and the coolant outlet temperature of the internal combustion engine are equal to the ambient temperature, request closed valve and do not request start of either the fuel operated heater or the electrical pump, if the vehicle is in a hybrid or an internal combustion engine driving mode and the ambient temperature is above or equal to 25° C. and the coolant outlet temperature of the fuel operated heater and the coolant outlet temperature of the internal combustion engine is higher than the ambient temperature, request closed valve and do not request start of either the fuel operated heater or the electrical pump, if the vehicle is in electrical drive and the ambient temperature is above or equal to 25° C. and the coolant outlet temperature of the fuel operated heater and the coolant outlet temperature of the internal combustion engine are equal to the ambient temperature, request closed valve and do not request start of either the fuel operated heater or the electrical pump, if the vehicle is in electrical drive and the ambient temperature is above or equal to 25° C. and the coolant outlet temperature of the fuel operated heater and the coolant outlet temperature of the internal combustion engine is higher than the ambient temperature, request closed valve and do not request start of either the fuel operated heater or the electrical pump.

\* \* \* \* \*